United States Patent
Souiai et al.

(10) Patent No.: US 12,444,148 B2
(45) Date of Patent: Oct. 14, 2025

(54) CAMERA CALIBRATION USING DEPTH SENSOR DATA

(71) Applicant: Magic Leap, Inc., Plantation, FL (US)

(72) Inventors: Mohamed Souiai, San Francisco, CA (US); Moshe Bouhnik, Holon (IL); Ankur Gupta, Union City, CA (US)

(73) Assignee: Magic Leap, Inc., Plantation, FL (US)

( * ) Notice: Subject to any disclaimer, the term of this patent is extended or adjusted under 35 U.S.C. 154(b) by 124 days.

(21) Appl. No.: 18/688,588

(22) PCT Filed: Sep. 8, 2022

(86) PCT No.: PCT/US2022/076080
§ 371 (c)(1),
(2) Date: Mar. 1, 2024

(87) PCT Pub. No.: WO2023/039452
PCT Pub. Date: Mar. 16, 2023

(65) Prior Publication Data
US 2024/0371114 A1    Nov. 7, 2024

Related U.S. Application Data

(60) Provisional application No. 63/260,998, filed on Sep. 8, 2021.

(51) Int. Cl.
*G06T 19/00* (2011.01)
*G06T 7/80* (2017.01)
*G06T 19/20* (2011.01)

(52) U.S. Cl.
CPC .............. *G06T 19/006* (2013.01); *G06T 7/80* (2017.01); *G06T 19/20* (2013.01);
(Continued)

(58) Field of Classification Search
CPC ......... G06T 19/006; G06T 7/80; G06T 19/20; G06T 2207/10024; G06T 2219/2016; G06T 2207/30244; G06T 2207/10028
See application file for complete search history.

(56) References Cited

U.S. PATENT DOCUMENTS

| | | |
|---|---|---|
| 8,736,636 B2 | 5/2014 | Kang |
| 8,793,770 B2 | 7/2014 | Lim |

(Continued)

FOREIGN PATENT DOCUMENTS

| | | |
|---|---|---|
| CN | 112509057 A | 3/2021 |
| CN | 112946609 A | 6/2021 |

OTHER PUBLICATIONS

Extended European Search Report in European Appln. No. 22868292.8, mailed on May 15, 2025, 10 pages.

(Continued)

*Primary Examiner* — Xilin Guo
(74) *Attorney, Agent, or Firm* — Fish & Richardson P.C.

(57) ABSTRACT

Methods, systems, and apparatus, including computer programs encoded on computer storage media, for using depth data to update camera calibration data. In some implementations, a frame of data is captured including (i) depth data from a depth sensor of a device, and (ii) image data from a camera of the device. Selected points from the depth data are transformed, using camera calibration data for the camera, to a three-dimensional space that is based on the image data. The transformed points are projected onto the two-dimensional image data from the camera. Updated camera calibration data is generated based on differences between (i) the locations of the projected points and (ii) locations that features representing the selected points appear in the two-dimensional image data from the camera. The updated (Continued)

camera calibration data can be used in a simultaneous localization and mapping process.

13 Claims, 4 Drawing Sheets

(52) U.S. Cl.
CPC ............. *G06T 2207/10024* (2013.01); *G06T 2207/10028* (2013.01); *G06T 2219/2016* (2013.01)

(56) References Cited

U.S. PATENT DOCUMENTS

| | | | |
|---|---|---|---|
| 8,823,855 B2 | 9/2014 | Hwang | |
| 8,874,673 B2 | 10/2014 | Kim | |
| 11,006,093 B1* | 5/2021 | Hegyi | H04N 13/246 |
| 2012/0007943 A1* | 1/2012 | Tytgat | G01B 11/22 348/E7.083 |
| 2013/0201291 A1* | 8/2013 | Liu | G06F 3/012 348/47 |
| 2017/0372126 A1 | 12/2017 | Shotton et al. | |
| 2018/0322648 A1* | 11/2018 | Lu | G06F 18/2411 |
| 2018/0330521 A1 | 11/2018 | Samples et al. | |
| 2021/0319575 A1* | 10/2021 | Zheng | B64U 20/87 |

OTHER PUBLICATIONS

Mishra et al., "Extrinsic Calibration of a 3D-LIDAR and a Camera," Paper, Presented at Proceedings of the 2020 IEEE Intelligent Vehicles Symposium (IV), Las Vegas, NV, Oct. 19-Nov. 13, 2020, pp. 1765-1770.
International Search Report & Written Opinion in International Appln. No. PCT/US2022/076080, mailed Nov. 22, 2022, 10 pages.
Levinson and Thrun, "Automatic Online Calibration of Cameras and Lasers," Robotics: Science and Systems, 2013, 2 (7): 8 pages.
Pereira et al., "Self calibration of multiple LIDARs and cameras on autonomous vehicles," Robotics and Autonomous Systems, Sep. 2016, 83:326-337, 31 pages.
Tamas and Kato, "Targetless Calibration of a Lidar—Perspective Camera Pair," Paper, Presented at Proceedings of the 2013 IEEE International Conference on Computer Vision Workshops, Sydney, Australia, Dec. 2-8, 2013, pp. 668-675.
Velas et al., "Calibration of RGB Camera With Velodyne LiDAR," Paper, Presented at Proceedings of the 22nd International Conference in Central European Computer Graphics, Visualization and Computer Vision in co-operation with Eurographics Association, Pilsen, Czech Republic, Jun. 2-5, 2014, 10 pages.
Wikipedia.org [online], "Epipolar geometry," Jun. 14, 2020, retrieved on Jun. 17, 2020, retrieved from URL<https://en.wikipedia.org/w/index.php?title=Epipolar_geometry&oldid=962461592>, 4 pages.
Wikipedia.org [online], "Essential matrix," Mar. 6, 2020, retrieved on Jul. 14, 2020, retrieved from URL<https://en.wikipedia.org/w/index.php?title=Essential_matrix&oldid=944275225>, 8 pages.
Wikipedia.org [online], "Image rectification," May 30, 2020, retrieved on Jul. 14, 2020, retrieved from URL<https://en.wikipedia.org/w/index.php?title=Image_rectification&oldid=959814158>, 7 pages.
Wikipedia.org [online], "Reprojection error," Jan. 28, 2016, retrieved on Jun. 17, 2020, retrieved from URL<https://en.wikipedia.org/w/index.php?title=Reprojection_error&oldid=702095618>, 1 page.

\* cited by examiner

US 12,444,148 B2

CAMERA CALIBRATION USING DEPTH SENSOR DATA

CROSS-REFERENCE TO RELATED APPLICATION

This application is a National Stage Application of International Application No. PCT/US2022/076080, filed Sep. 8, 2022, which claims the benefit of U.S. Provisional Application No. 63/260,998 filed on Sep. 8, 2021, which is hereby incorporated by reference in its entirety.

BACKGROUND

Augmented reality ("AR") and mixed reality ("MR") devices can include multiple sensors. Some examples of sensors cameras, accelerometers, gyroscopes, global positioning system receivers, and a magnetometer, e.g., a compass.

An AR device can receive data from multiple sensors and combine the data to determine an output for a user. For instance, an AR device can receive gyroscope and camera data from respective sensors and, using the received data, present content on a display. The AR device can generate an environment map using the sensor data, e.g., camera data, and use the environment map to present the content on the display.

SUMMARY

A computer vision system can use sensor data to generate an environment model of an environment in which a device, e.g., the computer vision system, is located, to estimate a position of the device within the environment, or both. For instance, the computer vision system can use data from multiple sensors to generate the environment model for the environment in which the device is located. The sensors can include depth sensors, cameras, inertial measurement units, or a combination of two or more of these. To provide more accurate results and operate more efficiently, the system can determine the calibration of sensors based on pairs of sensor data captures of an environment performed at approximately the same time (e.g., and thus were acquired with approximately the same physical state of the system and position of the system with respect to the environment).

The computer vision system can use a simultaneous localization and mapping ("SLAM") process to both update the environment model and determine an estimated location of the device in the environment. The location of the device can include position data, orientation data, or both. As part of the SLAM process, the computer vision system can use bundle adjustment ("BA"), a set-membership process, a statistical process, or another appropriate process. For instance, the computer vision system can determine, as part of the SLAM process, a three-dimensional point in the environment model that represents an observable point in the environment. The computer vision system can then use BA to refine the position of the three-dimensional point in the environment model, e.g., to make a more accurate prediction of the position of the observable point using additional data, updated data, or both.

Independent of the SLAM process, the computer vision system can determine camera calibration data using data from two sensors, such as a camera and a depth sensor. The camera calibration data can indicate a position of one camera with respect to another sensor, e.g., a reference camera or another appropriate reference. The camera calibration data can include translation data, rotation data, or both, that indicates the position of the one camera with respect to another sensor or a reference position.

For instance, the computer vision system can determine the camera calibration data by minimizing a reprojection error, epipolar constraints, or both, as discussed in more detail below. Determination of the camera calibration data separate from the SLAM process can increase an accuracy of the camera calibration data. It can also reduce the susceptibility of camera calibration data to noise, e.g., caused by estimated map points for the environment model, the estimated device location, or both. This provides significant advantages over systems that determine the camera calibration data as part of the SLAM process.

The computer vision system can then use the estimated camera calibration data as input to the SLAM process. For instance, the computer vision system can use the estimated camera calibration data as input to a BA process for use refining a position of a three-dimensional point in the environment model, a position of the device that captured the image, or both. In addition to the camera calibration data as input, the computer vision system can use image data, and other appropriate data, e.g., inertial measurement unit data, to optimize predictions of likely positions at which the device or a camera captured the images represented by the image data, an update for the environment model, or both.

The calibration technique is designed for calibration of camera sensors using substantially synchronous single (or multiple) frames from any depth sensor and multiple cameras. In other words, each iteration of calibration adjustment can be based on a single frame of data, comprising (i) at least one depth sensor capture from a depth sensor on a device, and (ii) images captured from each of multiple cameras on the device. The captures in the frame are at least loosely synchronized. The cameras and depth sensor may be strictly synchronized, but are not required to be. For example, cameras may capture data at one rate (e.g., 60 captures per second), and the depth sensor may capture data at another rate (e.g., 15 captures per second), and synchronization or alignment between the two may not be strictly enforced. Instead, the system may define each frame used for calibration as a depth sensor capture and the camera capture from each camera that is nearest in time to the depth sensor capture. As a result, the difference in time between the depth sensor captures and the image captures will be no greater than half the period between captures of the highest-frame rate sensor (e.g., maximum of $\frac{1}{120}$ of a second in the case where the cameras capture images at 60 frames per second).

The calibration technique does not need any special setup or external equipment in the surrounding environment. For example, the system does not need any specific arrangement of visual or distance references, e.g., no ArUco marker patterns, no robot arms for odometery, no Vicon optical reference devices, etc. Instead, the system can simply use the natural corners, edges, and other depth features in an observed environment, as well as the visual features (e.g., color, contrast, textures, and other aspects of camera data) of the environment, to select and align reference points or "key points" to perform calibration. The system thus uses the captured data about environment features, e.g., points on edges, corners, or other landmarks on objects that happen to be in the environment, to perform the calibration. The correspondence of data representing the environment features in the depth sensor data and the camera image data provides the basis for optimizing the calibration. The technique is able to achieve higher accuracy using multimodal data, e.g., combining depth sensor data and camera data. The calibration process is independent of the SLAM process and requires less data and less processing than traditional calibration methods. This makes the technique suitable to be used for calibration during use of the device and also for original factory calibration.

One of the innovations in the calibration process is the optimization using a cost function that is based on multiple relationships or constraints relating the depth information and the camera image data. For example, the cost function can measure a combination of (i) reprojection error based on relating 3D key points in the depth sensor data to 2D key points in the camera data, and (ii) epipolar error based on differences between locations of the key points in the 2D depth sensor plane and the 2D camera data. As a result, the optimization can attempt to minimize both reprojection error and epipolar error, which can provide faster convergence in optimization, higher accuracy, and less computation and power usage, including due to the ability to use fewer key points in the analysis.

For example, to address reprojection error, the system can detect 3D points on objects in the real world using the depth sensor and select key points (referred to as 3D depth sensor points), e.g., points representing landmarks or distinct features of objects, such as points on corners or edges, as a selected subset of depth data measurements (e.g., 20 points, 50 points, etc.). The system transforms the 3D depth sensor points to a camera image in the current frame of data using current calibration data (e.g., extrinsic parameters) to obtain 3D camera points with respect to the camera plane. In other words, the system uses the current calibration to align the depth measurement from the AR headset with the image data from the camera to combine depth data and image data. The system then projects the 3D camera points to the two dimensions of the original camera image, e.g., projecting from 3D to the 2D plane of the camera sensor. The difference between the location of the key point as projected from the 3D camera point and the location that the key point actually occurs in the original 2D camera frame provides an error measurement that can be used to adjust the camera calibration. This error measure is determined for each of the key points chosen, so each frame has multiple error measurement In an ideal system, if the depth sensor and camera were perfectly calibrated, the error would be zero. The system can perform optimization to adjust the calibration parameters to minimize the error between the projected points and corresponding original 2D points, to minimize the total or average error across the set of key points.

As a second constraint used for optimization, the system can also determine epipolar error by comparing the locations of the key points in the original 2D camera image with the 2D positions that the key points occur in the depth sensor data. In general, depth sensor data can include a 2D pixel grid, with depth values for each pixel indicating sensed depth for that pixel. Once the 3D depth sensor key points are determined, the 2D positions of those key points on the depth sensor plane (e.g., their locations in the depth sensor pixel grid) is known. The system applies the current calibration data to relate the 2D key points for the depth sensor with the corresponding locations of the key points on the on the 2D camera image. The difference in locations, after the current calibration data is taken into account, provides another source of error that can be used to optimize the calibration data. In an ideal system, with perfect calibration, these error in this measurement would also be zero. As with the reprojection error, the system can adjust the calibration to minimize the total or average error across the set of key points. In many cases, the system considers the reprojection error and epipolar error for a frame together in a combined cost function, allowing greater accuracy and faster convergence to improved calibration parameter values.

The computer vision system can perform aggregated single-frame online calibration using loosely synchronous depth sensor data and camera image data. The calibration can be considered to be performed "online" not because any communication network is necessary, but rather that the calibration can be performed in an ongoing manner to dynamically adjust calibration while the system (e.g., an AR headset) is powered on and in use. In other words, calibration can be performed in real time or substantially in real time, while the device is powered on and in use to provide augmented reality visual output that aligns with the user's view of the physical environment. The calibration analysis can be done for individual frames, determining the combined error across the set of key points selected for the frame. Different frames are captured at different times and different positions of the device with respect to the environment, and so different portions of the environment are in view of the sensors for different frames. As a result, different sets of key points can be chosen for different frames. The system can aggregate the error measurements or parameter adjustments determined for different frames (e.g., across each of multiple successive frames over a time period). For example, averaging the error measures or calibration parameters determined for the frames occurring over the duration of a second can improve stability of the calibration data, smoothing changes and filtering out momentary deformations. The aggregation can occur over other time periods (e.g., 5 seconds, 10 seconds, etc.) and can optionally be applied over the series of frames in sliding windows (e.g., for overlapping 5-second time periods of time range 0-5, time range 1-6, time range 2-7, etc.) for smoothed transitions in the calibration data over time.

In general, one aspect of the subject matter described in this specification can be embodied in methods that include the actions of capturing, by the one or more computing devices, a frame of data that includes (i) depth data from a depth sensor of a device, the depth data indicating distances from the depth sensor to objects in an environment of the device, and (ii) image data from a camera of the device, the image data representing visible features the objects in the environment; transforming, by the one or more computing devices, selected points from the depth data using camera calibration data for the camera, wherein the selected points are transformed to corresponding locations in a three-dimensional space that is based on the image data, wherein the calibration data indicates a first translation and a first rotation between the camera and a reference position on the device; projecting, by the one or more computing devices, the transformed points from the three-dimensional space to the two-dimensional image data from the camera; generating, by the one or more computing devices, updated camera calibration data based on differences between (i) the locations of the projected points and (ii) locations that features representing the selected points appear in the two-dimensional image data from the camera, wherein the updated camera calibration data indicates a second translation and a second rotation between the camera and the reference position; and using, by the one or more computing devices, the updated camera calibration data in a simultaneous localization and mapping process that determines at least one of an update to a three-dimensional environment model for the environment and an estimated position of the device within the environment.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination.

In some implementations, the updated camera calibration data is further generated based on a transformation between representations of the selected points in the two-dimensional image data from the camera and representations of the selected points in a two-dimensional depth sensor space representing a plane of data capture for the depth sensor data.

In some implementations, generating the updated camera calibration data includes updating the camera calibration data using a cost function that accounts for reprojection error and epipolar error.

In some implementations, the transforming, projecting, and generating are performed independently of the simultaneous localization and mapping process.

In some implementations, the method includes: capturing multiple frames of data that each include depth data from the depth sensor and image data from the camera; and performing the transforming and projecting for each of the multiple frames using a respective set of selected points for each of the multiple frames. Generating the updated camera calibration data includes generating the updated camera calibration data by aggregating calibration parameters determined for the respective frames in the multiple frames or by minimizing error across the multiple frames.

In some implementations, the camera is a first camera, and the method further includes: capturing a second frame of data that includes (i) data from the depth sensor and (ii) second image data from a second camera of the device, the second camera capturing a different view of the environment than the first camera; transforming, by the one or more computing devices, second selected points from the depth data using second camera calibration data for the second camera, wherein the second selected points are transformed to corresponding locations in a second three-dimensional space that is based on the second image data; projecting, by the one or more computing devices, the transformed points from the second three-dimensional space to the two-dimensional second image data from the second camera to generate second projected points; generating, by the one or more computing devices, updated second camera calibration data based on differences between (i) the locations of the second projected points and (ii) locations that features representing the second selected points appear in the two-dimensional second image data from the second camera; and using, by the one or more computing devices, the updated second camera calibration data in the simultaneous localization and mapping process.

In some implementations, the method includes selecting the selected points, wherein the selected points include landmark points located on edges, corners, or boundaries of the objects in the environment that the one or more computing devices selects based on at least one of: visual contrast of regions of the image data; or depth contrast of regions of the depth sensor data.

In some implementations, the device is an augmented reality headset having a display, the headset being configured to present on the display visual content that is aligned with a view of the environment by a wearer of the headset; and the camera and the depth sensor are rigidly fixed to the headset, and wherein the updated calibration data compensates for a deformation of the headset that occurs while the headset is worn by the wearer and that alters a position of the camera with respect to the depth sensor.

In some implementations, generating the updated camera calibration data includes adjusting the camera calibration to reduce a combined measure of error that is based on respective error measures determined for each of the selected points.

In some implementations, the depth sensor is a photonic mixer device, and the camera is a color camera, the depth sensor and the camera being mounted at different locations of the device.

In another general aspect, a computer-implemented method includes: receiving, from a depth sensor included in a device, depth data that indicates a distance from the depth sensor to a point in an environment in which the device is located when the device was at a particular position in the environment; receiving, from a camera included in the device, image data that represents the point in the environment when the device was at the particular position in the environment; transforming the depth data from a depth sensor space to transformed image data in a camera space using prior camera calibration data that indicates a first translation and a first rotation between the camera and a reference position; determining a difference between the transformed image data and the received image data; generating updated camera calibration data that indicates a second translation and a second rotation between the camera and the reference position using the difference between the transformed image data and the received image data; and providing the updated camera calibration data for use as input to a simultaneous localization and mapping process that determines an update to an environment model for the environment and an transformed position of the device within the environment.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In some implementations, transforming the depth data from the depth sensor space to transformed image data in the camera space comprises: transforming, using previously generated camera calibration data, a three-dimensional depth sensor space point for the point to an transformed three-dimensional camera space point for the point; and projecting, using a projection between a three-dimensional camera space and a two-dimensional camera space that associates points from the three-dimensional camera space with corresponding points on the two-dimensional camera space, the transformed three-dimensional camera space point for the point onto an transformed two-dimensional camera space point for the point.

In some implementations, determining a difference between the transformed image data and the received image data comprises: determining the difference between the transformed two-dimensional camera space point for the point and a measured two-dimensional camera space point for the point, the measured two-dimensional camera space point determined using the image data.

In some implementations, generating the updated camera calibration data comprises: determining whether the difference between the transformed two-dimensional camera space point for the point and the measured two-dimensional camera space point for the point satisfies a threshold difference; and in response to determining that the difference does not satisfy the threshold difference, generating new camera calibration data by adjusting the previously generated camera calibration data using the difference between the transformed two-dimensional camera space point for the point and the measured two-dimensional camera space point for the point.

In some implementations, the method includes transforming, using the new camera calibration data, the three-dimensional depth sensor space point for the point to a second transformed three-dimensional camera space point for the point; projecting, using the projection between the three-dimensional camera space and the two-dimensional camera space that associates points from the three-dimensional camera space with corresponding points on the two-dimensional camera space, the second transformed three-dimensional camera space point for the point onto a second transformed two-dimensional camera space point for the point; determining whether a second difference between the second transformed two-dimensional camera space point for the point and the measured two-dimensional camera space point for the point satisfies the threshold difference; and in response to determining that the second difference satisfies the threshold difference, using the new camera calibration data as the updated camera calibration data.

In some implementations, generating the new camera calibration data by adjusting the previously generated camera calibration data using the difference between the transformed two-dimensional camera space point for the point and the measured two-dimensional camera space point for the point comprises: determining whether a number of points represented by both depth data and image data captured when the device was at the particular position in the environment satisfies a threshold quantity of points; in response to determining that the number of points represented by both depth data and image data captured when the device was at the particular position in the environment does not satisfy the threshold quantity of points: determining an epipolar difference between a two-dimensional depth sensor space point for the point and the measured two-dimensional camera space point for the point by rectifying a two-dimensional depth sensor space using the prior camera calibration data; and generating the new camera calibration data by adjusting the previously generated camera calibration data using a) the difference between the transformed two-dimensional camera space point for the point and the measured two-dimensional camera space point for the point and b) the epipolar difference between the two-dimensional depth sensor space point for the point and the measured two-dimensional camera space point for the point.

In some implementations, determining the three-dimensional depth sensor space point for the point by back-projecting the two-dimensional depth sensor space point for the point to a three-dimensional depth sensor space.

In some implementations, the method includes transforming, using the updated camera calibration data, the depth data from the depth sensor space to second transformed image data in the camera space; and determining whether a second difference between the second transformed image data and the received image data satisfies a threshold difference, wherein providing the updated camera calibration data for use as input to a simultaneous localization and mapping process that determines an update to an environment model for the environment and an transformed position of the device within the environment is responsive to determining that the second difference satisfies the threshold difference.

In some implementations, the method includes determining an epipolar difference between a two-dimensional depth sensor space point for the point and the received image data by rectifying a two-dimensional depth sensor space using the prior camera calibration data, wherein generated the updated camera calibration data comprises: generating the updated camera calibration data that indicates the second translation and the second rotation between the camera and the reference position using a) the difference between the transformed image data and the received image data, and b) the epipolar difference between the two-dimensional depth sensor space point for the point and the received image data.

In some implementations, the method includes determining whether a number of points represented by both depth data and image data captured when the device was at the particular position in the environment satisfies a threshold quantity of points, wherein determining an epipolar difference between a two-dimensional depth sensor space point for the point and the received image data is responsive to determining that the number of points represented by both depth data and image data captured when the device was at the particular position in the environment does not satisfy the threshold quantity of points.

In some implementations, the method includes generating the updated camera calibration data comprises generating the updated camera calibration data that indicates the second translation and the second rotation between the camera and the reference position using a combination of a) the difference between the transformed image data and the received image data, and b) the epipolar difference between the two-dimensional depth sensor space point for the point and the received image data In some implementations, receiving the depth data comprises receiving the depth data that includes a first pixel that represents the point; and receiving the image data comprises receiving the image data that includes a second pixel that represents the point.

In some implementations, determining whether the difference between the transformed image data and the received image data satisfies a threshold difference, wherein: generating the updated camera calibration data that indicates a second translation and a second rotation between the camera and the reference position using the difference between the transformed image data and the received image data is responsive to determining that the difference between the transformed image data and the received image data does not satisfy the threshold difference.

In some implementations, transforming the depth data comprises transforming a proper subset of the depth data captured when the device was at the particular position in the environment from the depth sensor space to the transformed image data in the camera space using the prior camera calibration data that indicates the first translation and the first rotation between the camera and the reference position.

In some implementations, receiving the image data comprises: receiving, from the camera from two or more cameras included in the device, first image data that represents the point in the environment when the device was at the particular position in the environment; and receiving, from a second camera from two or more cameras included in the device, second image data that represents a second point in the environment when the device was at the particular position in the environment; determining a difference between the transformed image data and the received image data comprises: determining a first difference between the transformed image data and the first image data for the point; and determining a second difference between the transformed image data and the second image data for the second point; and generating the updated camera calibration data comprises: generating the updated camera calibration data i) that indicates the second translation and the second rotation between the camera and the reference position and a third translation and a third rotation between the second camera and the reference position and ii) using the first difference and the second difference.

In some implementations, transforming the depth data comprises: transforming a first portion of the depth data from the depth sensor space to first transformed image data in the camera space using first prior camera calibration data that indicates the first translation and the first rotation between the camera and the reference position; and transforming a second portion of the depth data from the depth sensor space to second transformed image data in the camera space using second prior camera calibration data that indicates a fourth translation and a fourth rotation between the second camera and the reference position; determining the first difference comprises determining the first difference between the first transformed image data and the first image data for the point; and determining the second difference comprises determining the second difference between the second transformed image data and the second image data for the second point In some implementations, receiving the depth data comprises receiving the depth data from a photonic mixer device that is a separate sensor from the camera.

The subject matter described in this specification can be implemented in various embodiments and may result in one or more of the following advantages. In some implementations, separate determination of camera calibration data from a SLAM process can enable a device to correct camera calibration data for each key frame, e.g., every 10 frames, every 30 frames, etc., which is typically too computationally expensive to perform in systems that determine the camera calibration data as part of a SLAM process. In some implementations, the camera calibration process described in this document, e.g., using depth sensor data, is faster, uses fewer computer resources, e.g., processor cycles or memory or both, or a combination of these, compared to other systems. The use of multimodal data for calibration can also provide higher accuracy that prior approaches. In some implementations, the camera calibration process described in this document can determine camera calibration data independent of an amount of deformation of a device that includes the camera. In some implementations, the camera calibration process described in this document can aggregate data for key frames to improve stability of the calibration data over time.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
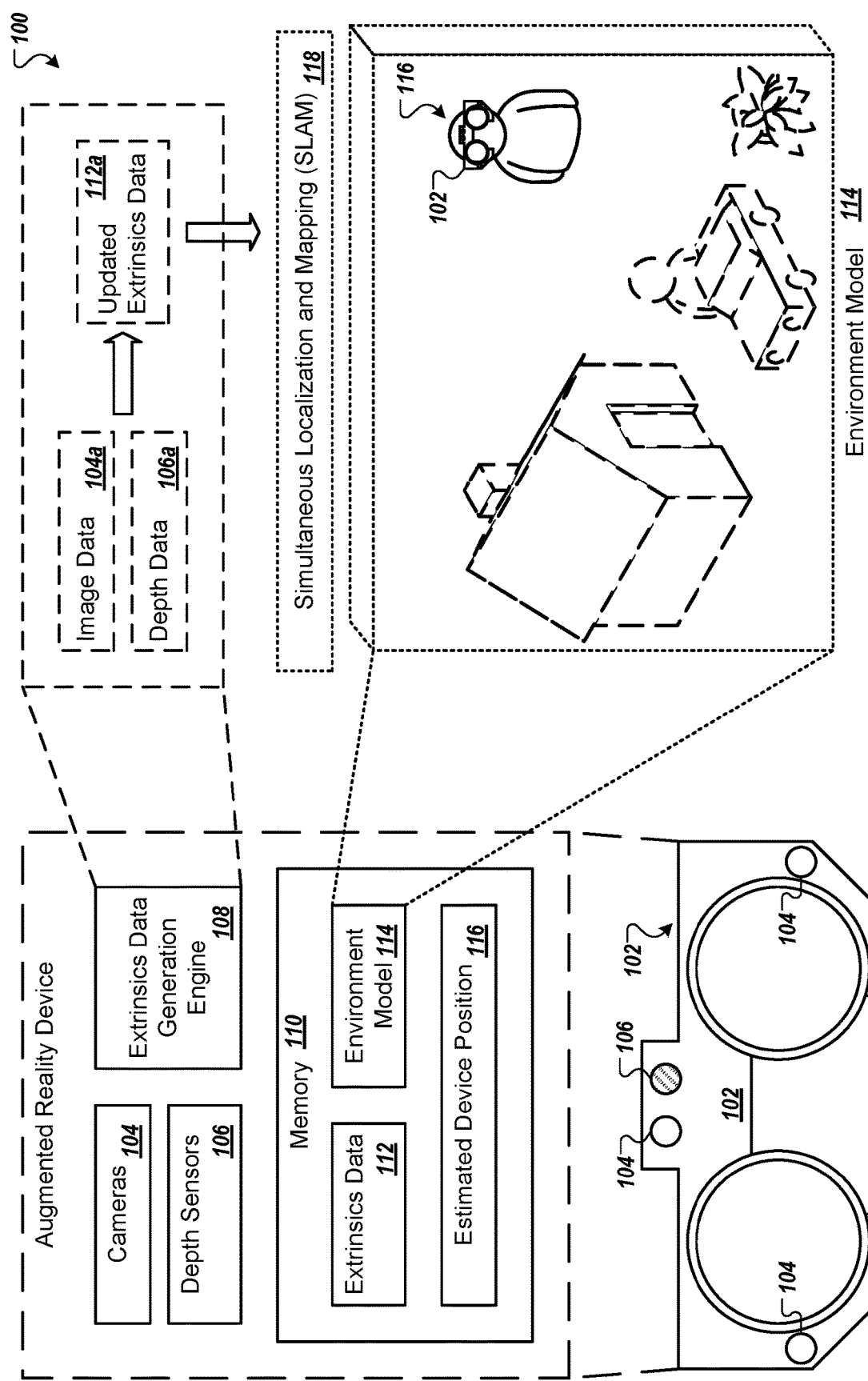
FIG. 1 depicts an example environment in which a device updates extrinsics data using depth sensor data.

FIG. 1 depicts an example system 100 in which a device 102 updates extrinsics data using depth sensor data. Although FIG. 1 is described with reference to an augmented reality device 102 as the device, any other appropriate computer vision system can be used instead of, or in addition to, an augmented reality device 102.

Separate from performing simultaneous localization and mapping ("SLAM") for received sensor data, e.g., from the cameras 104 and one or more depth sensors 106, the augmented reality device 102 can update extrinsics data 112, e.g., sensor calibration data having values for extrinsic parameters, for one or more of the cameras 104. The extrinsics data 112 can describe the physical position of one sensor, such as a camera 104 relative to another or relative to a fixed reference point on the device 102. The extrinsics data 112 for a particular camera can indicate, a translation and a rotation between the particular camera 104 and a reference position. The reference position is a reference position on the augmented reality device 102. The reference position can be a reference sensor, such as a reference camera or a reference depth sensor, or another appropriate reference position on the augmented reality device 102.

As the device 102 is used, various factors may adjust the positions of the sensors relative to each other and relative to the frame of the device 102, and as a result change what the extrinsic data 112 should be to align the data from the various sensors. For example, thermal changes can shift positions, user movement adjusting the device 102 while worn may temporarily adjust the relative positions, the pull of cables or wires may shift positions, or wear over time or the device 102 being dropped may adjust the positions. In augmented reality applications, the relative positions of the sensors can have a large effect on the quality of output, with even small misalignments between sensors resulting in large offsets between displayed outputs and the correct position in the user's field of view. As a result, the ability to repeatedly and efficiently adjust the extrinsic parameters to be able to accurately align the sensor data from the various sensors (e.g., two or three cameras and at least one depth sensor) is important to the effective function of the device 102.

The augmented reality device 102, or another device, can use the extrinsics data 112 in a SLAM process, e.g., to update an environment model 114 of a physical environment in which the augmented reality device 102 is located, an estimated position 116 of the augmented reality device 102 in the physical environment, or both. By updating the extrinsics data 112 separate from the SLAM process, e.g., prior to SLAM processing so the extrinsics data 112 can be an input to the SLAM process, the augmented reality device 102 can determine more accurate SLAM data, such as a more accurate environment model 114, a more accurate estimated device position 116, or both. The computing workflow can also be made more efficient by separating the evaluation and updating of extrinsics data 112.

As the augmented reality device 102 moves through the physical environment, the augmented reality device 102 obtains image data 104a using the cameras 104 and depth data 106a captured by the depth sensor 106. The image data 104a can be any appropriate image data, such as an RGB color image captured by a camera 104 or other data that represents an image captured by a camera. The depth data 106a can be any appropriate depth data, such as a two-dimensional ("2D") image that indicates, for each pixel in the image, an estimated distance from the depth sensor 106 to a point in the physical environment that corresponds with the pixel. For example, the depth sensor 106 can be a photonic mixer device (PMD) depth sensor or other time-of-flight camera.

The augmented reality device 102 repeatedly captures frames of image data from the various cameras 104 and from the depth sensor 106 (e.g., at 30 frames per second, 60 frames per second, 120 frames per second, etc.). For instance, when the augmented reality device 102 is at a particular physical location and orientation in the physical environment, the cameras 104 and depth sensor 106 can capture a particular set of image data 104a and depth data 106a from that particular physical location, representing the current perspective of the environment at the time. The augmented reality device 102 can store, in memory 110, the image data 104a and the depth data 106a for successive data captures for processing.

In use, the device 102 is worn while the cameras 104 and depth sensor 106 repeatedly capture data, and the device 102 displays augmented reality overlay data into view of the user using a display or projection system in the device 102. The device 102 repeatedly evaluates and adjusts the extrinsics data 112 while the device 102 operates, allowing the device 102 to maintain alignment of captured image data 104a and depth data 106a even as the device 102 may experience deformations, shocks, or other disturbances that may alter the orientations of the cameras 104 and depth sensor 106 relative to each other.

The device 102 uses an extrinsics data generation engine 108 to repeatedly update the extrinsic data 112 during operation of the device 102 (e.g., concurrently with image capture by the device 102 and augmented reality display output that adapts to changes in the position of the device 102 relative to the environment). The extrinsics data generation engine 108 can be included in the augmented reality device 102 (e.g., the headset) or another device that communicates with the augmented reality device 102 (e.g., a processing device that is clipped to clothes, carried in a pocket, etc. or even a device not carried by the user such as a laptop computer or a remote server). The extrinsics data generation engine 108 receives at least some of the image data 104a and at least some of the depth data 106a as input. For example, the extrinsics data generation engine 108 can receive successive sets of captured data over time, where each set of captured data includes image data 104a and depth data 106a captured from a common position and orientation of the device 102. The extrinsics data generation engine 108 can determine updated extrinsics data 112a that is based on the relationship of the sensors 104, 106 that existed at a particular point in time or at a particular position in which the augmented reality device 102 was located. As a result, the device 102 can use different values for the extrinsics data 112 to different sets of captured data from the sensors 104, 106, so that SLAM processing and other processing each use the extrinsic parameter values that best represent the physical state of the device 102 at the time the captured data was acquired. In other words, different frames or groups of frames can have separate sets of extrinsics data 112 determined for and provided with the captured data as input to a SLAM process to enhance accuracy and robustness to physical deformation. Each set of extrinsics data 112 calculated can include separate position information for each of the different sensors 104, 106 separately.

As described in more detail below, the extrinsics data generation engine 108 can compare data captured from the cameras 106 with data captured from the depth sensor 104 to optimize the extrinsic data 112. This can involve examining the relationships between a selected set of reference points or "key points" in both 2D and 3D spaces. Depth-based calibration uses the depth data 104a to estimate deformation. As the locations of key points from camera data diverge from the locations of those points indicated by the depth data (whether assessed in a 3D space or a 2D space), the differences can signal deformation or change in relative position of the sensors 104, 106, which the extrinsics data generation engine 108 then compensates for by adjusting the extrinsics data 112. For example, extrinsics data generation engine 108 can optimize the extrinsics data 112 to minimize reprojection error between (i) 3D locations of a set of key points that are indicated by the depth sensor data 106a and (ii) 3D locations of the same key points that are determined using the camera data 104a. In addition, or as an alternative, extrinsics data generation engine 108 can apply an epipolar constraint for 2D projections of the key points, to optimize the extrinsics data 112 to minimize epipolar error based on (i) 2D locations of the key points in the depth sensor data 106a (e.g., 2D locations on the depth sensor plane) and (ii) 2D locations of the key points in the 2D camera image for each of the respective cameras 106. In many cases, applying both reprojection-based optimization and epipolar-contraint-based optimization together provides more accurate results, faster convergence, and In general, the extrinsics data generation engine 108 can project, transform, or otherwise convert data from one sensor type (either the image data 104a or the depth data 106a), to a format that can be compared with data from the other sensor type, with the data from the two sources being related using the extrinsics data 112. The extrinsics data generation engine 108 can determine a difference between the data from the two sources. If the difference does not satisfy a threshold, e.g., if the difference is greater than a threshold value close to zero, the extrinsics data generation engine 108 can determine updated extrinsics data 112 that minimizes the difference between the two data sets. For instance, if the difference is greater than or is equal to the threshold value, the extrinsics data generation engine 108 can determine the updated extrinsics data 112.

If the difference satisfies the threshold value, the extrinsics data generation engine 108 can determine to skip generation of additional updated extrinsics data 112. For instance, the extrinsics data generation engine 108 can determine use the existing extrinsics data 112 from memory.

The comparison of camera image data with depth information provides additional constraint on the optimization problem of obtaining accurate extrinsics data 112, which enables fast convergence with a small number of key points. For example, compared to systems that estimate extrinsic parameters based on camera data alone, fewer key points need to be compared in the analysis, resulting in higher efficiency and lower computational complexity. This greater efficiency allows the extrinsic parameters to be computed more frequently and with lower power, which is important for battery-powered devices that are worn or carried by the user. In some cases, the device 102 can optimize and correct the extrinsic data 112 for each keyframe, which may be, for example, every 5 frames of data captured, every 15 frames of data captured, etc. The device 102 may optionally aggregate data across keyframes to improve stability, for example, by using a smoothing or averaging process over a series of multiple keyframes. For example, the device 102 may use a moving average of the extrinsic parameters over the last N keyframes, where N is an integer such as 3, 5, 10, etc. Optionally, the average may be weighted to give higher weight to the most recently determined extrinsic parameter values and decreasing weight to older extrinsic parameters in the window covered by the moving average. As a simpler option, the device 102 may simply average non-overlapping groups of keyframes, such as by averaging the extrinsic parameters over each one-second period.

The extrinsics data generation engine 108, or another component in the system, can store the updated extrinsics data 112a in the memory 110. The memory 110 can include any type of memory, multiple separate memories, or both. For instance, the memory 110 can include a random access memory in which the updated extrinsics data 112 is stored and a solid state drive in which the environment model 114, the estimated device position 116, or both, are stored.

A SLAM engine 118, included in the augmented reality device 102 or another system connected to the augmented reality device 102, can then use the updated extrinsics data 112a for the particular physical location to determine an update for the environment model 114, an update for the estimated device position 116, or both. For example, the SLAM engine 118 can determine the estimated device position 116 for the particular location in the physical environment in which the augmented reality device 102 is located.

As shown in FIG. 1, the environment model 114 includes the objects with dashed lines while the objects in solid lines represent the location of the estimated device position 116, and the augmented reality device 102, if the environment model 114 included data for either or both. For instance, the SLAM engine 118 can use the image data 104a, the updated extrinsics data 112a, and optionally the depth data 106a, all for the particular physical location to update the environment model 114 that depicts the house, a person standing by a car, and a plant, e.g., while a person standing at approximately the estimated device position 116 is wearing the augmented reality device 102.

The augmented reality device 102, and the extrinsics data generation engine 108, can repeat the process of generating the updated extrinsics data 112a for multiple physical locations of the augmented reality device 102. For example, as the augmented reality device 102 moves through the physical environment along a path, the extrinsics data generation engine 108 can generate updated extrinsics data 112a for each of multiple positions along the path.

The SLAM engine 118 can then use the corresponding updated extrinsics data 112a to update the environment model 114, the estimated device position 116, or both, for the multiple positions along the path. For instance, for a particular position in the multiple positions, the SLAM engine 118 can access the updated extrinsics data 112a for that particular position. The SLAM engine 118 can then perform, for the particular position, an iterative process of determining an update for the environment model 114, determining an updated estimated device position 116, or both.

In some prior systems, camera extrinsic parameters were not updated during use of an augmented reality device (e.g., with only original factory calibrations used), which can cause poor performance as misalignments between sensors result in errors in perceiving the three-dimensional properties of the environment and also errors in aligning outputs to the environment. Some systems have attempted to update camera extrinsic parameters as part of SLAM processing, but this adds additional complexity and inefficiency in the processing, as the SLAM outputs are dependent on the calibration data that the process then is also attempting to determine. In addition, coupling extrinsics generation with bundle adjustment makes the estimation of calibration parameters susceptible to noise in SLAM-estimated poses and map points.

The process of online or real-time calibration of the sensors of an augmented reality device 102, such as an AR headset, can be improved by separating the calibration process from the processes, such as SLAM, for mapping the environment and determining the position of the device 102 in the environment. As a result, the SLAM process benefits from the accuracy of extrinsics data 112 (e.g., values of sensor extrinsic parameters) that is dynamically updated on an ongoing basis, but does not need to burden the localization and mapping with iterative or complex processes to determine those updates. The device 102 can perform a calibration process, such as performed by the extrinsics data generation engine 108, that is a producer of extrinsics data 112, and the SLAM process 118 can be strictly a consumer of the extrinsics data 112 (e.g., making use of the calibration results but not affecting generation of them), thus allowing the calibration tasks to be performed separately from bundle adjustment and SLAM. Among other benefits, this separation makes the SLAM processing more accurate and computationally efficient.

The augmented reality device 102 and the features described for it can be implemented as a local device or devices, such as a headset worn by a user and potentially a connected processing unit which may be worn or carried. In other implementations, one or more of the components or functions described with reference to the augmented reality device 102 can be included in a separate system, such as on a server that communicates with the augmented reality device 102 using a network. The network (not shown), can be a local area network (LAN), wide area network (WAN), the Internet, or a combination thereof. The separate system may use a single server computer or multiple server computers operating in conjunction with one another, including, for example, a set of remote computers deployed as a cloud computing service.

The augmented reality device 102 can include several different functional components, including the extrinsics data generation engine 108, and the SLAM engine 118. The extrinsics data generation engine 108, the SLAM engine 118, or a combination of these, can include one or more data processing apparatuses. For instance, each of the extrinsics data generation engine 108, and the SLAM engine 118 can include one or more data processors and instructions that cause the one or more data processors to perform the operations discussed herein.

The various functional components of the augmented reality device 102 may be installed on one or more computers as separate functional components or as different modules of a same functional component. For example, the extrinsics data generation engine 108, the SLAM engine 118, or both, can be implemented as computer programs installed on one or more computers in one or more locations that are coupled to each through a network. In cloud-based systems for example, these components can be implemented by individual computing nodes of a distributed computing system.

Figure 2:
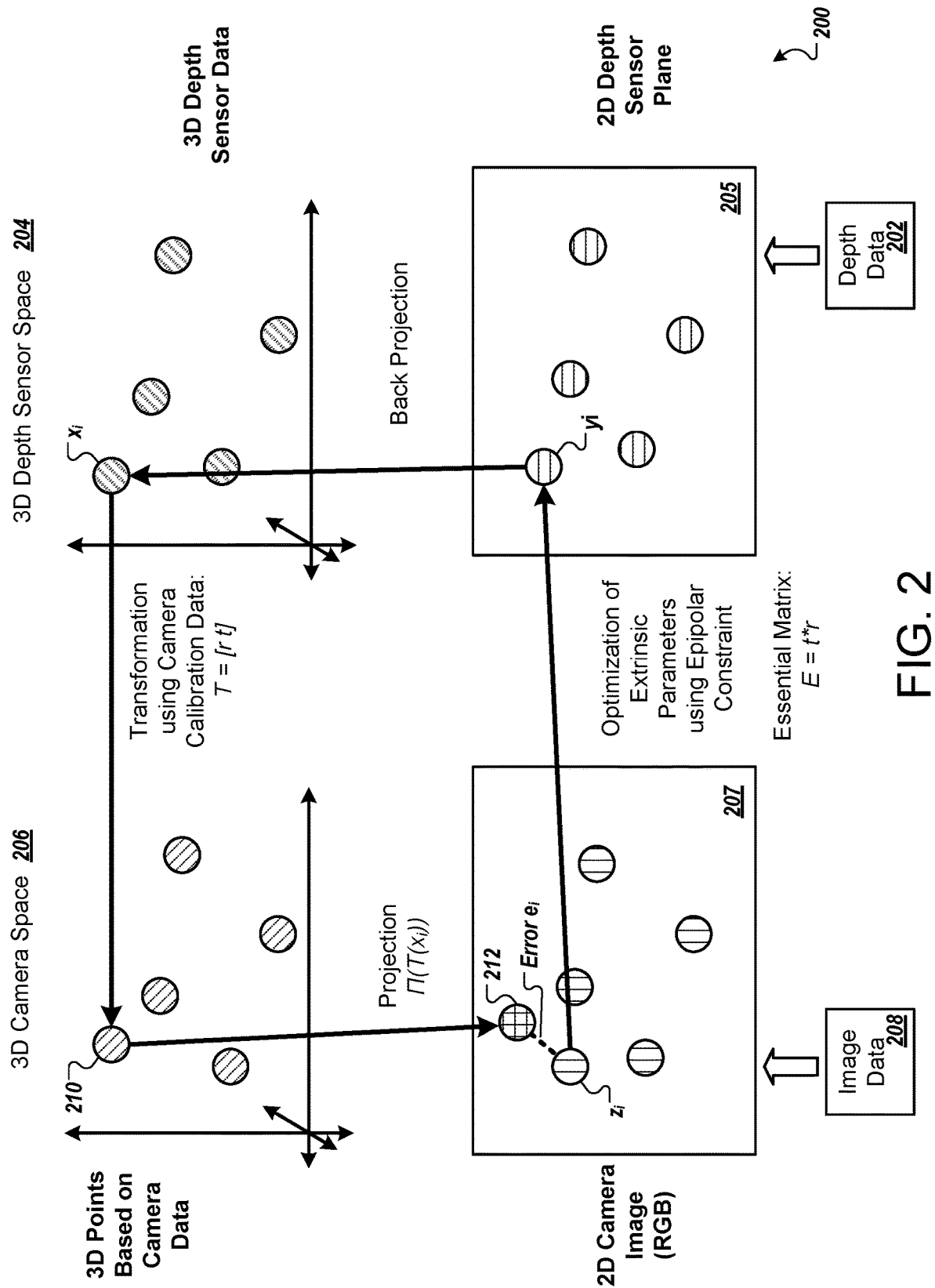
FIG. 2 depicts an example environment for transforming depth data to estimated image data.

FIG. 2 depicts example processing 200 for using depth sensor data 106a and camera image data 104a to update extrinsic parameters for the augmented reality device 102. In the description of the example, the processing is described as being performed by the device 102, but the processing can alternatively be performed by another device, e.g., a separate processing unit, a remote server, etc. As discussed above and as explained in more detail below, the processing can include repeated optimization of extrinsic parameters based on reprojection error, epipolar error, or a combination of both.

Briefly, FIG. 2 shows four different representations of camera data and depth sensor data and operations and relationships among them. The example involves data captured for a single frame, which includes a single capture from a single camera 104 and a corresponding single capture from the depth sensor 106 taken very near in time to the capture from the camera (e.g., at substantially the same position of the device 102 with respect to the environment). The same processing shown in FIG. 2 can be performed for other sensor pairs (e.g., for a second camera with respect to the depth sensor 106, for a third camera with respect to the depth sensor 106, etc.), and can also be repeated for multiple different captured frames of data.

FIG. 2 illustrates two 3D data representations, (1) a 3D depth sensor space 204, in which features based solely on the data from the depth sensor 106 are represented in a 3D coordinate system, and (2) a 3D camera space 206 that has visual features captured by the camera 104 represented in a 3D coordinate system. The features in the 3D camera space 206 can integrate data from the depth sensor with the camera data to place data in the 3D camera space. FIG. 2 also illustrates two 2D representations, (1) a 2D depth sensor space, representing a 2D pixel grid for the locations that sensed features were detected at the depth sensor plane, and (2) a 2D camera image space, representing the 2D pixel array captured at the image sensor plane of the camera 106.

The process involves selecting certain key points that will be transformed or projected between the different 3D spaces 204, 206 and 2D spaces 205, 207. The device 102 selects key points based on features of the depth data and camera image data. Typically multiple key points are selected for each frame, e.g., some number such as 10, 20, 30, 50, etc. selected for each frame. The key points are typically located on different objects, at locations distributed across the view provided by the depth sensor and image data, especially in regions where the view of the camera 104 and depth sensor 106 overlap. The device 102 may store a set of criteria (e.g., thresholds or ranges for different characteristics) to apply, and the device 102 can select as key points the points that meet the criteria or select a subset that best meet the criteria (e.g., a subset assigned the highest scores using a scoring function).

The key points can be selected as points at landmarks identified on the 3D contours sensed by the depth image data, e.g., points at corners of objects, points on edges of objects, points at the boundaries or borders of objects, and so on. For example, the device 102 can use the differences in depth at different positions in the depth data to select points of high depth contrast with surrounding regions (e.g., where depth along a z-axis changes abruptly with respect to changes position on x/y-axes), thus representing the border of one object that may be in front of a second object. In some implementations, the key points are selected separately for each frame or each group of frames. The key points used can be selected based on the data in the frame (or a group of frames) alone, without referring to a constructed 3D map, SLAM output, or other external data. In some implementations key points may additionally be selected based on visual distinctiveness in image data (e.g., using edge detection, intensity contrast, color contrast, etc.).

The device 102 uses the selected key points to assess and optimize the extrinsic parameters that set the calibration between the camera 104 and the depth sensor 106. This involves relating instances of the key points in the different 2D and 3D spaces 204-207 and assessing the error that occurs. In the example, a particular key point representing a single point in the physical environment is represented in the respective spaces as point $x_i$ in the 3D depth sensor space 204, as point 210 in the 3D camera space 206, as point $z_i$ in the 2D camera space 107, and as point $y_i$ in the 2D depth sensor space 205.

The relationships between the different spaces are based on calibration data, specifically extrinsic parameters r and/in the example. Parameter r is a rotation matrix and parameter/ is a translation matrix. The values of these parameters together specify the relationship that aligns the view of the depth sensor 106 and the view of the camera 104. The processing shown in FIG. 2 is used to update the calibration and to provide updated values for r and/that can then be used in the SLAM process to provide higher quality results.

In many situations, small physical deformations can occur while a virtual reality headset is used. Changes to the physical positions of the sensors relative to each other can occur due to a user tugging on a cord, a user adjusting the fit of the headset, and many other interactions. These changes, if not compensated for, can noticeably reduce the quality of the visual output of the headset, by introducing inaccuracy in the mapping and localization based on the sensor data, which can lead to the presentation of augmented reality content that does not properly align with the user's view of the physical environment around them. By repeatedly assessing and adjusting the calibration accuracy during use of the device, the headset maintains high accuracy of sensor calibration even through deformations and the headset provides high-quality virtual content that is accurately aligned to the spatial positions (including depth) of objects that the wearer perceives in the environment.

As part of the process, the device 102 can retrieve depth data 202. The device 102 can retrieve the depth data 202 from memory, from a sensor, e.g., a depth sensor 106, or both. For instance, the depth sensor 106 can capture the depth data 202 and store the depth data in memory. The device 102 can then retrieve the depth data 202 from the memory.

As discussed above, the depth data can include data that indicates, for each of multiple points in a physical environment, an estimated distance from the depth sensor 106 to the point in the physical environment. For instance, the depth data 202 can include multiple pixels in a 2D grid and, for each of the pixels, a sensed distance from the depth sensor to a corresponding point in the physical environment that is detected by the pixel. As a result, the depth data 202 can include a 2D grid of pixels corresponding to different positions on the depth sensor, with each pixel having a sensed depth value.

The depth data 202 can be represented in the 3D depth sensor space 204. For instance, each point can have x-y coordinates that correspond to a location of the point in the depth data 202 captured by a corresponding depth sensor or multiple depth sensors. The distance from the sensor plane can be a third coordinate, e.g., a z coordinate. In the example shown in FIG. 2, the depth data 202 shows five selected key points, including a 3D point x, in the 3D depth sensor space 204.

The device 102 can transform the selected key points from the 3D depth sensor space 204 to the 3D camera space 206. In other words, the device 102 transforms the depth sensor pixels to the camera pixels using the calibration data. In effect, the transformation can warp the depth data from the depth sensor 106 onto the camera image data to provide a depth value for each pixel of the camera image (or at least those in the portion where the field of view of the camera and depth sensor overlap). The device 102 can use the most recent set of camera calibration data (e.g., prior to or at the time of capturing the current frame) to perform the transformation. For example, the camera calibration data can include values for the translation matrix/and the rotation matrix r that indicate a relationship between the camera 106 that captured the image data 208 and a reference position. The reference position can be the depth sensor 106 that captured the depth data 202. The depth sensor 106 can be located approximately a center of the device 102 along a horizontal axis of the device 102. The reference position can optionally be another camera, which itself may be located at a central position of the device in a horizontal direction. The reference position can be any other predetermined portion or component of the device 102.

In the example, the device 102 transforms the 3D point $x_i$ and the other selected key points from the 3D depth sensor space 204 to the 3D camera space 206. The device 102 can determine, as a result of the transformation, a 3D point 210 in the 3D camera space 206 that corresponds to the 3D point $x_i$ that the depth sensor 106 sensed. The device 102 can use a transformation T=[r t], which uses the prior values of the camera calibration parameters r and t, to transform the depth point $x_i$ from a 3D space 204 to the point 210 in the 3D space 206. In some examples, the device can multiply the transformation T by the depth point $x_i$: $T*x_i$ or $x_i*T$. The device 102 transforms each of the selected key points from the 3D space 204 to corresponding points in the 3D space 206, based on the same set of calibration data.

The device 102 then projects the key points from the 3D space 206 to the 2D camera space 207. For example, the device 102 projects the estimated 3D point 210 to obtain point 212 in the 2D camera space 207. For example, the device determine use a projection P, defined in equation (1) below, to determine the estimated 2D camera space point 212 in the 2D camera space.

$$P = \prod(T(x_i)) \qquad (1)$$

The device 102 compares the projected points with the actual points, $z_i$, that the key points occur in the original camera image. For example, the device 102 determines a difference between (1) the 2D point 212, which was projected from 3D point 210, which in turn was transformed from point $x_i$, and (2) the original 2D point $z_i$ in the image data 208 that corresponds to the pixel for 3D point 210. If the calibration data r and/is accurate, the distance or error between the projected 2D point 212 and the actual 2D point $z_i$ should be very small or zero. On the other hand, if there is inaccuracy in the calibration data, that will be evident as the reprojection onto the 2D camera image 207, which incorporates depth information transformed using the calibration data, has introduced error.

As result, the difference between 2D points 212 and $z_i$ can indicate an error $e_i$ for the camera calibration data r, t. The device 102 can determine the error for each of the selected key points. In the example, five key points are used and shown in each of the four spaces, although only one of the projected points (e.g., a single point 212) is illustrated in the 2D space 207. For example, the device can calculate the error e using equation (2), below.

$$e = \prod(T(x_i)) - z_i \qquad (2)$$

The device 102 can use the error e for each of the selected key points to determine updated camera calibration data. For instance, the device 102 can determine an error e(T) in prior camera calibration data for multiple key points i using equation (3), below. The device can use the error e(T), e.g., a reprojection error, to determine updated camera calibration data. For example, the device 102 can perform non-linear optimization to determine updated camera calibration data that minimizes the error e(T). As discussed above, this represents a summation of the magnitude of differences between (i) the 2D key point locations resulting from the 3D depth sensor key points $x_i$ being transformed based on the calibration data (e.g., term T) and projected (e.g., term Π) to the 2D space 207 and (ii) the corresponding 2D camera key points $z_i$ where the same key points of the environment are shown in the 2D space 207 in the original camera data.

$$e(T) = \sum_i \left\| \prod(T(x_i)) - z_i \right\|_2 \qquad (3)$$

In some implementations, the device 102 can also use an epipolar constraint as another measure of error in the calibration data. Using the additional epipolar constraint enables the optimization to converge faster and with fewer key points needed per frame, ultimately resulting in more accurate calibration data more quickly and with lower computation demands.

In some cases, different modes of calculating the error can be used depending on the conditions. For example, in some cases, the reprojection error alone may be used unless the number of high-quality key points available is less than a predetermined threshold, such as twenty-five. Then, if the number of points is less than twenty-five, the device 102 can switch to using measures of both reprojection error and epipolar error.

To apply the epipolar constraint and determine epipolar error, the device 102 uses representations of the key points in both the 2D camera space 207 and the 2D depth sensor space 205. To obtain the 2D points in the depth sensor space 205, the device 102 back-projects the 3D key points to obtain 2D depth points. For example, the 3D point labeled xi is back projected to the 2D point labeled $y_i$. This back-projection can be simply a determination of the location on the 2D plane of the depth sensor that the key points occur. In other words, where the 3D key point x, has an x-axis, y-axis, and z-axis (depth) position, simply the x-axis and y-axis positions are retained to show where the key point was located on the x-y pixel grid of the depth sensor.

The device 102 relates the key points in the 2D camera space 207 and the 2D depth sensor space 205 can use an essential matrix E=t*r, which uses the same calibration matrices/and r used in the transformation T between the 3D spaces. The epipolar constraint means that, if the calibration data in the essential matrix is correct, the difference in location resulting from application of that matrix between the 2D depth point $y_i$ and the corresponding 2D depth point $z_i$ should be very small or zero. The error between the 2D representations of any given key point is given by $y_i E z_i$. The total epipolar error, epi_error, across the entire set of key points is obtained by summing the epipolar error for each of the individual key points, as shown in Equation 4 below.

$$\text{epi\_error} = \sum\nolimits_{i} \|y_i E z_i\|_2 \quad (4)$$

The device 102 can use a cost function that incorporates both reprojection error and epipolar error, as set forth in Equation 5 below. This equation shows error e(T) where the first term represents reprojection error for the set of key points and the second term represents epipolar error for the set of key points. The second term can have a scaling factor or weighting factor, θ, that adjusts the contribution of the epipolar error relative to the reprojection error. In some cases, the value is set at one for an equal weighting, or the value may be set higher or lower to increase or decrease the impact of the epipolar constraint on the optimization compared to the impact of the reprojection error. To generate the updated calibration parameters, the device 102 adjusts the values of the matrices t and r to minimize the total error e(T). This is effective because both T in the first term and E in the second term are functions of the same matrices t and r (e.g., T=[r t] and E=t*r.

$$e(T) = \sum\nolimits_{i} \left\| \prod (T(x_i)) - z_i \right\|_2 + \theta \sum\nolimits_{i} \|y_i E z_i\|_2 \quad (5)$$

In the equations above, the subscript "2" at the end of the terms denotes the dimension of the values. In other words, the error is determined for two dimensions (e.g., x-axis and y-axis positions). This can also be seen in that $y_i$ and $z_i$ are two-dimensional points, and that the equation projects the 3D points $x_i$ down to two dimensions.

The device can then determine update camera calibration data that minimizes the combined error e(T), which incorporates the reprojection error and epipolar error across each of the selected key points. The calibration data optimization does not need to take place for every frame of data captured by the device 102. For example, the device 102 may update the calibration data for each key frame in the system, which may be, e.g., every 10 frames, every 30 frames, etc. This calibration process can be performed repeatedly, on an ongoing basis as the device 102 is powered on or used. In addition, the same calibration processes can be performed for each of the different cameras of the device 102, so that calibration data for each camera is updated. As the calibration data is updated it is provided as input to the SLAM process, which can be very sensitive to miscalibration.

In some implementations, the calibration data is determined using the data across multiple frames to smooth the adjustments and reduce noise. For example, the calibration data can be determined for each key frame occurring over a period of time, such as a 1-second period. Key frames may occur at, e.g., 5 frames per second, with image data occurring at a much higher rate, such as 30 or 60 frames per second. Thus, over a 1-second period, 5 different calculations of the calibration data can be determined. The calibrations for these 5 calculations can be averaged, and the averaged calibration data can be provided to the SLAM process to be used in processing the next frames of data that are acquired.

Figure 3:
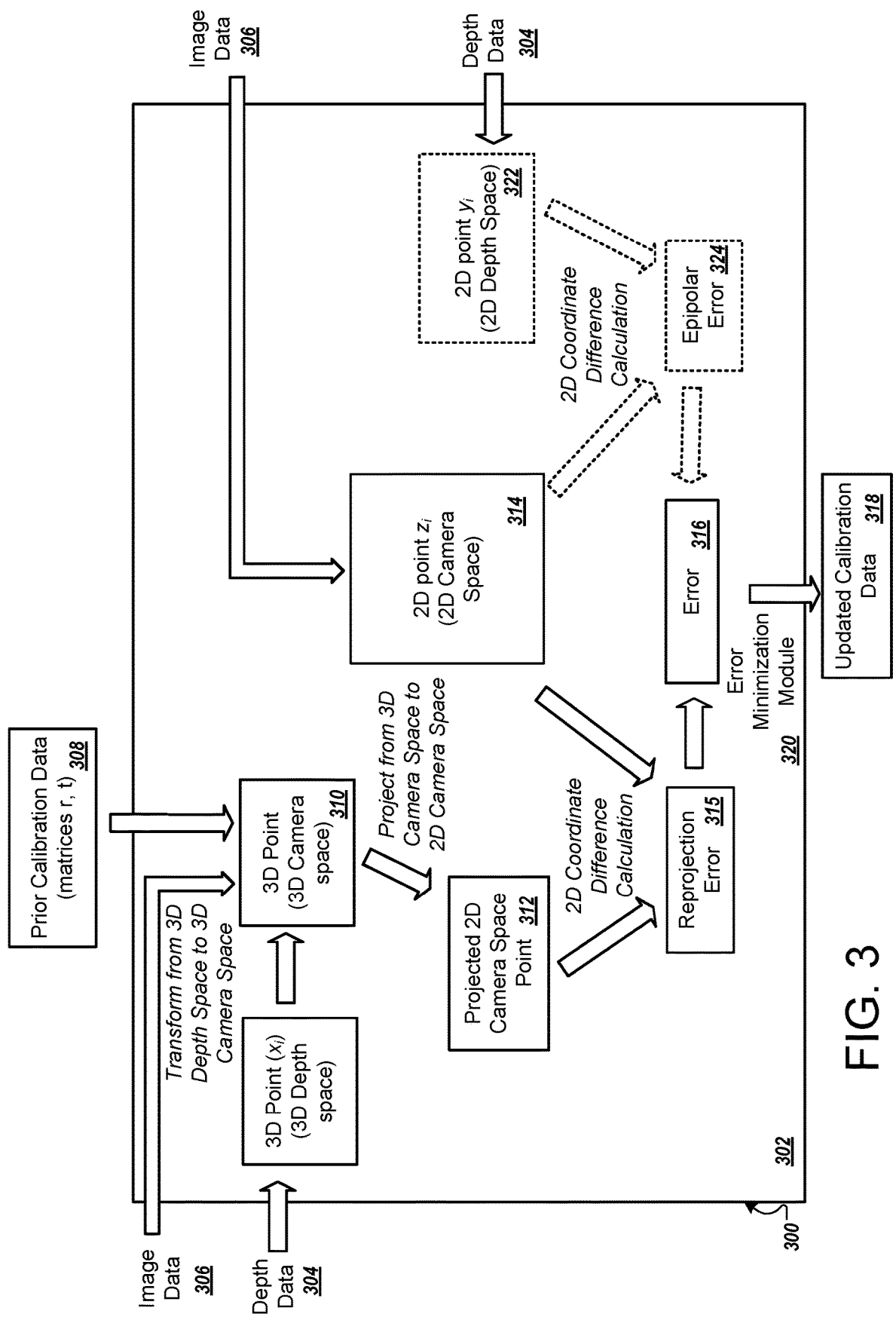
FIG. 3 depicts an example environment in which updated calibration data is generated.

FIG. 3 depicts an example 300 in which a calibration engine 302 generates updated calibration data 318, e.g., values for sensor extrinsic parameters such as matrices r and t discussed above. The calibration engine 302 can access, as input, depth data 304, image data 306, and prior calibration data 308. For convenience in illustration, the same depth data 304 and image data 306 for a single frame are shown on both the right and left sides of the drawing. As with FIG. 2, the illustration shows processing for only a single key point in the environment, and for only a single frame of captured data. Nevertheless, the operations shown are typically performed for multiple key points per frame, and are further performed repeatedly for multiple frames.

The calibration engine 302 can use the prior calibration data 308 to transform a 3D point from the depth data 304 to a 3D point 310 in the 3D camera space, e.g., by using the calibration data to warp the depth information onto the image data 306. The calibration engine 302 can project the estimated 3D point 310 from the 3D camera space to a 2D camera space, the original 2D camera image, to determine a projected 2D point 312.

The calibration engine 302 can then compare the projected 2D point 312 with a 2D point 314 from the image data 306. In particular, the calibration engine 302 can compare (i) the location of the actual 2D point 314 where a key point in the environment is shown in the 2D image data 306 with (ii) the location of the projected 2D point 312. The calibration engine 302 can determine a reprojection error 315 using a result of the comparison. The reprojection error for a single key point can represent a difference between the projected 2D point 312 and the corresponding original 2D point 314. The overall reprojection error for a frame can be a sum or combination of the reprojection error for each of multiple key points selected for the frame.

In some implementations, the engine 302 selectively updates calibration data only when error is above a minimum threshold. Thus, if the reprojection error (and/or epipolar error or combined error) is less than the minimum threshold the engine 302 may determine that no update is needed for the frame.

In some implementations, an additional source of information indicating error in the calibration data can also be used. Some implementations can use the epipolar error in addition to reprojection error under all conditions. Other implementations can use the epipolar error selectively, such as when the reprojection error exceeds a threshold, thus representing that a significant error is present.

To apply epipolar constraints, the engine 302 can use the same image data 306, depth data 304, and calibration data 308 used to determine the reprojection error. The calibration engine 302 can use a 2D point 322 (e.g., 2D location that a key point registers on the depth sensor's pixel grid) and the 2D point 214 (e.g., where the same key point registers on the camera sensor's pixel grid) to determine an epipolar error 324 between the two points. This epipolar error 324 can represent a difference between the points 314, 322 when transformed using the calibration data 308. Conceptually, the epipolar error 324 can represent error lines through the respective points 314, 322 are projected to a 3D space.

The calibration engine 302 can use the epipolar error 324 and the reprojection error 315 to determine a total error 316 used to optimize the calibration data 308. The calibration engine 302 can combine, e.g., sum, the reprojection error 315 and the epipolar error 324 to determine the total error 316 for the set of key points selected for the frame. The engine 302 can then use the error 316 to determine the updated calibration data 318.

An error minimization module 320 can use any appropriate process to determine the updated calibration data 318 that minimizes the error 316. The first updated calibration data can be used as the updated calibration data 318, e.g., by a SLAM process.

In some implementations, the image data 306 is for an image in a sequence of video images. For instance, the image data 306 can be for a frame in a video sequence. The depth data 304 can be for a corresponding frame of depth data captured at substantially the same time, or within a threshold period of time, as the image data 306. The depth data 304 includes data for at least some of the same points in the physical environment as the points represented by the image data 306. For instance, a depth sensor that captures the depth data 304 can capture data for a larger area of the physical environment than a camera that captures the image data 306. The calibration engine 302, the error minimization module 320, or both, can then use portions of the same depth data 304 for calibration data, e.g., extrinsics data, for different cameras. For example, the calibration engine 302 can use a first portion of the depth data 304 to determine updated calibration data for a first camera and a second portion of the depth data 304 to determine updated calibration data for a second, different camera. The first portion and the second portion of the depth data 304 can at least partially overlap, e.g., when images captured by the first camera and the second, different camera depict at least some of the same content from the physical environment. In some examples, the first portion and the second portion of the depth data 304 do not overlap, e.g., when the images captured by the first camera and the second, different camera do not depict any of the same content from the physical environment.

The calibration engine 302, the error minimization module 320, or both, can be part of the extrinsics data generation engine 108 described with reference to FIG. 1. The calibration engine 302, the error minimization module 320, or a combination of these, can include one or more data processing apparatuses. For instance, each of the calibration engine 302, and the error minimization module 320 can include one or more data processors and instructions that cause the one or more data processors to perform the operations discussed herein.

The various functional components described with reference to the environment 300 may be installed on one or more computers as separate functional components or as different modules of a same functional component. For example, the calibration engine 302, the error minimization module 320, or both, can be implemented as computer programs installed on one or more computers in one or more locations that are coupled to each through a network. In cloud-based systems for example, these components can be implemented by individual computing nodes of a distributed computing system.

Figure 4:
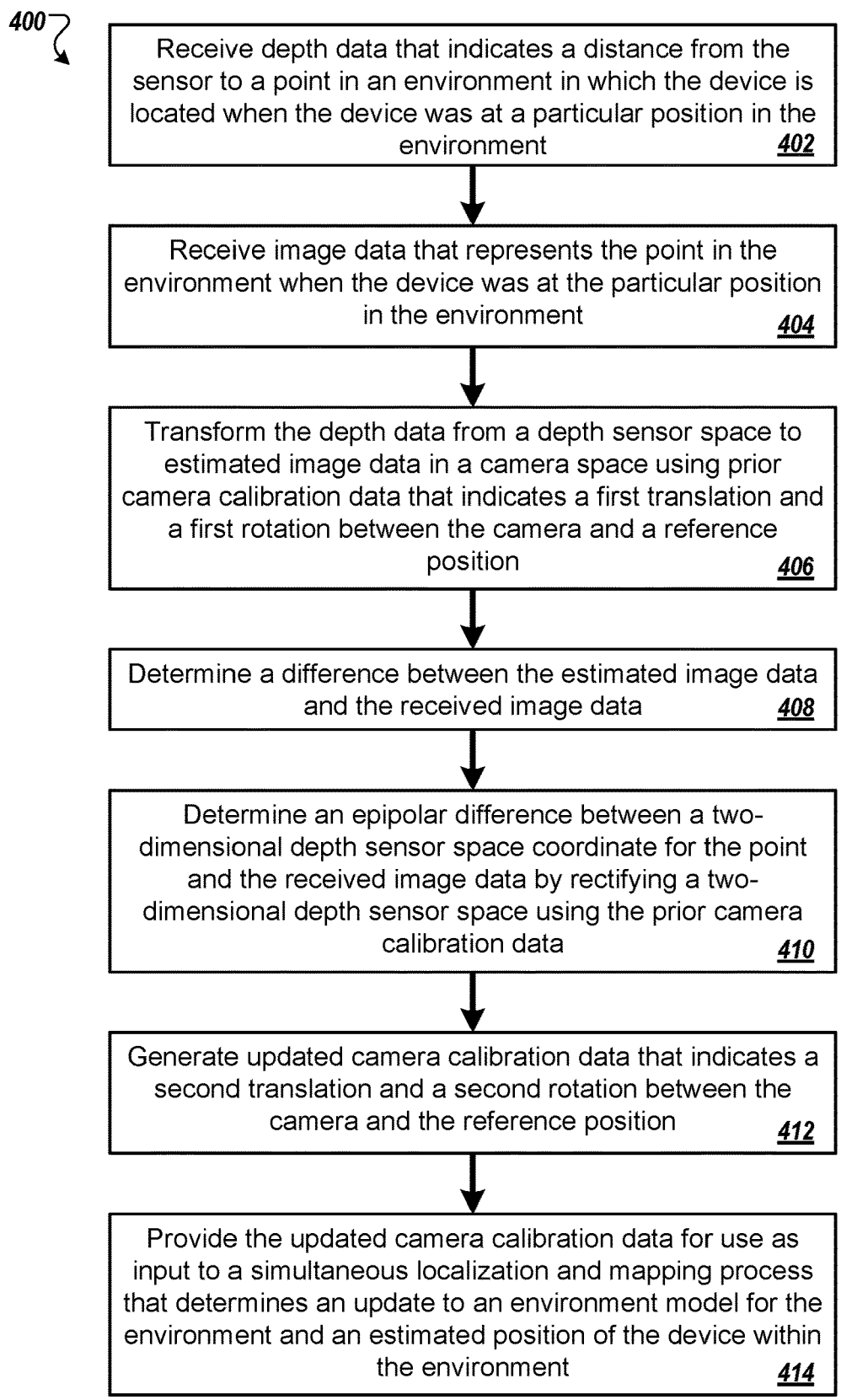
FIG. 4 is a flow diagram of a process for updating calibration data.

FIG. 4 is a flow diagram of a process 400 for updating calibration data. For example, the process 400 can be used by a device such as the augmented reality device 102 from the system 100. In some examples, the error determination engine 302, the error minimization engine 320, or both, from the environment 300 can perform one or more of the steps in the process 400, e.g., one or more of steps 402 through 412.

A device receives depth data that indicates a distance from the sensor to a point in an environment in which the device is located when the device was at a particular position in the environment (402). The device can receive the depth data from a depth sensor, such as a range imager. The device can receive the depth data from a depth sensor included in the device or in another device.

The device receives image data that represents the point in the environment when the device was at the particular position in the environment (404). The device can receive the image data from a camera. The camera can be included in the device or another device. The camera is included in the same device in which the depth sensor is included. In some examples, the device can receive a first portion of the image data from a first camera and a second, different portion of the image data from a second, different camera.

The depth data and the image data can be captured by the depth sensor and the camera at any appropriate time. For instance, the depth sensor can capture the depth data at substantially the same time that the camera captures the image data. This can enable loose synchronization of the depth data and the image data. In some implementations, the depth data can be captured within a threshold time period from the capture of the image data. For instance, the depth data can be captured during a first time period before or after the time period during which the image data is captured when the first time period is within the threshold time period from the second time period. In some implementations, the depth data can be captured at a first physical location that is within a threshold distance from a second physical location at which the image data was captured.

The device transforms the depth data from a depth sensor space to estimated image data in a camera space using prior camera calibration data that indicates a first translation and a first rotation between the camera and a reference position (406). The reference position can be any appropriate reference position within the device that includes the depth sensor and the camera. For instance, the reference position can be another camera, the depth sensor, an inertial measurement unit, or another appropriate position on the device, e.g., the rig that comprises the device.

The device can use any appropriate process to determine the estimated image data. The estimated image data can include an estimated image data point, e.g., in 2D or 3D. In some examples, the device can determine both an estimated 3D image data point and an estimated 2D image data point. In some instances, the device can perform one or more operations that enable the device to determine only an estimated 2D image data point.

The depth data and the image data can represent multiple points. In some implementations, the device can transform two or more of the multiple points from the depth sensor space to the camera space. This can include generating, for each of the two or more points, an estimated image point using a transformation.

The device determines a difference between the estimated image data and the received image data (408). The device can use any appropriate process to determine the difference between the estimated image data and the received image data. For instance, when the estimated image data is a point, the device can determine a distance, in a space, between the estimated image data point and the received image data point. Both points can represent the same position in a physical environment. The space can be a 2D space.

The device determines an epipolar difference between a two-dimensional depth sensor space coordinate for the point and the received image data by rectifying a two-dimensional depth sensor space using the prior camera calibration data (410). For example, when a number of points included in the estimated image data does not satisfy a threshold quantity of points, the device can determine the epipolar difference. The device can determine the epipolar difference using a matrix generated by combining, e.g., multiplying, the translation and rotation from the prior calibration data.

The device generates updated camera calibration data that indicates a second translation and a second rotation between the camera and the reference position (412). The device can use the difference, the epipolar difference, or both, to generate the updated camera calibration data. For instance, the device can generate the updated camera calibration data that minimizes the difference, the epipolar difference, or both. When the device determines multiple differences, multiple epipolar differences, or both, for various points in a physical environment that are represented by both the depth data 202 and the image data 208, the device can generate the updated calibration data that minimizes the multiple differences, the multiple epipolar differences, or both.

The device provides the updated camera calibration data for use as input to a simultaneous localization and mapping process that determines an update to an environment model for the environment and an estimated position of the device within the environment (414). For example, the device provides the updated camera calibration data to a SLAM engine included in the device.

The order of steps in the process 400 described above is illustrative only, and updating the calibration data can be performed in different orders. For example, the device can receive the depth data after or substantially concurrently with receipt of the image data. In some examples, the device can determine the epipolar difference and then determine the difference between the estimated image data and the received image data.

In some implementations, the process 400 can include additional steps, fewer steps, or some of the steps can be divided into multiple steps. For example, the device can maintain the depth data, maintain the image data, or both, instead of or in addition to receipt of the depth data, receipt of the image data, or both. In some examples, the device can perform steps 406, 412, and 414 without performing the other steps in the process 400.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., a Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A method performed by one or more computing devices, the method comprising:
    capturing, by the one or more computing devices, a frame of data that includes (i) depth data from a depth sensor of a device, the depth data indicating distances from the depth sensor to objects in an environment of the device, and (ii) image data from a camera of the device, the image data representing visible features the objects in the environment;
    transforming, by the one or more computing devices and as transformed points, selected points from the depth data using camera calibration data for the camera, wherein the selected points are transformed to corresponding locations in a three-dimensional space that is based on the image data, and wherein the camera calibration data indicates a first translation and a first rotation between the camera and a reference position on the device;
    projecting, by the one or more computing devices and as projected points, the transformed points from the three-dimensional space to two-dimensional image data from the camera;
    generating, by the one or more computing devices, updated camera calibration data based on differences between (i) locations of the projected points and (ii) locations that features representing the selected points appear in the two-dimensional image data from the camera, wherein the updated camera calibration data indicates a second translation and a second rotation between the camera and the reference position; and
    using, by the one or more computing devices, the updated camera calibration data in a simultaneous localization and mapping process that determines at least one of an update to a three-dimensional environment model for the environment and an estimated position of the device within the environment.

2. The method of claim 1, wherein the updated camera calibration data is further generated based on a transformation between representations of the selected points in the two-dimensional image data from the camera and representations of the selected points in a two-dimensional depth sensor space representing a plane of data capture for the depth data.

3. The method of claim 1, wherein generating the updated camera calibration data comprises updating the camera calibration data using a cost function that accounts for reprojection error and epipolar error.

4. The method of claim 1, wherein the transforming, projecting, and generating are performed independently of the simultaneous localization and mapping process.

5. The method of claim 1, comprising:
capturing multiple frames of data that each include depth data from the depth sensor and image data from the camera; and
performing the transforming and projecting for each of the multiple frames of data using a respective set of selected points for each of the multiple frames of data,
wherein generating the updated camera calibration data comprises generating the updated camera calibration data by aggregating calibration parameters determined for respective frames in the multiple frames of data or by minimizing error across the multiple frames of data.

6. The method of claim 1, wherein the camera is a first camera, and wherein the method comprises:
capturing a second frame of data that includes (i) data from the depth sensor and (ii) second image data from a second camera of the device, the second camera capturing a different view of the environment than the first camera;
transforming, by the one or more computing devices, second selected points from the depth data using second camera calibration data for the second camera, wherein the second selected points are transformed to corresponding locations in a second three-dimensional space that is based on the second image data;
projecting, by the one or more computing devices, the transformed points from the second three-dimensional space to two-dimensional second image data from the second camera to generate second projected points;
generating, by the one or more computing devices, updated second camera calibration data based on differences between (i) the locations of the second projected points and (ii) locations that features representing the second selected points appear in the two-dimensional second image data from the second camera; and
using, by the one or more computing devices, the updated second camera calibration data in the simultaneous localization and mapping process.

7. The method of claim 1, comprising selecting the selected points, wherein the selected points include landmark points located on edges, corners, or boundaries of the objects in the environment that the one or more computing devices selects based on at least one of:
visual contrast of regions of the image data; or
depth contrast of regions of the depth data.

8. The method of claim 1, wherein the device is an augmented reality headset having a display, the augmented reality headset being configured to present visual content on the display that is aligned with a view of the environment by a wearer of the augmented reality headset; and
wherein the camera and the depth sensor are rigidly fixed to the augmented reality headset, and wherein the updated camera calibration data compensates for a deformation of the augmented reality headset that occurs while the augmented reality headset is worn by the wearer and that alters a position of the camera with respect to the depth sensor.

9. The method of claim 1, wherein generating the updated camera calibration data comprises adjusting camera calibration to reduce a combined measure of error that is based on respective error measures determined for each of the selected points.

10. The method of claim 1, wherein the depth sensor is a photonic mixer device, and wherein the camera is a color camera, the depth sensor and the camera being mounted at different locations of the device.

11. A non-transitory computer-readable storage medium encoded with instructions that, when executed by one or more computing devices, cause the one or more computing devices to perform one or more operations, comprising:
capturing, by the one or more computing devices, a frame of data that includes (i) depth data from a depth sensor of a device, the depth data indicating distances from the depth sensor to objects in an environment of the device, and (ii) image data from a camera of the device, the image data representing visible features the objects in the environment;
transforming, by the one or more computing devices and as transformed points, selected points from the depth data using camera calibration data for the camera, wherein the selected points are transformed to corresponding locations in a three-dimensional space that is based on the image data, and wherein the camera calibration data indicates a first translation and a first rotation between the camera and a reference position on the device;
projecting, by the one or more computing devices and as projected points, the transformed points from the three-dimensional space to two-dimensional image data from the camera;
generating, by the one or more computing devices, updated camera calibration data based on differences between (i) locations of the projected points and (ii) locations that features representing the selected points appear in the two-dimensional image data from the camera, wherein the updated camera calibration data indicates a second translation and a second rotation between the camera and the reference position; and
using, by the one or more computing devices, the updated camera calibration data in a simultaneous localization and mapping process that determines at least one of an update to a three-dimensional environment model for the environment and an estimated position of the device within the environment.

12. A computer-implemented system comprising one or more computing devices and one or more storage devices on which are stored instructions that are operable, when executed by the one or more computing devices, to cause the computer-implemented system to perform one or more operations, comprising:
capturing, by the one or more computing devices, a frame of data that includes (i) depth data from a depth sensor of a device, the depth data indicating distances from the depth sensor to objects in an environment of the device, and (ii) image data from a camera of the device, the image data representing visible features the objects in the environment;
transforming, by the one or more computing devices and as transformed points, selected points from the depth data using camera calibration data for the camera, wherein the selected points are transformed to corresponding locations in a three-dimensional space that is based on the image data, and wherein the camera calibration data indicates a first translation and a first rotation between the camera and a reference position on the device;

projecting, by the one or more computing devices and as projected points, the transformed points from the three-dimensional space to two-dimensional image data from the camera;

generating, by the one or more computing devices, updated camera calibration data based on differences between (i) locations of the projected points and (ii) locations that features representing the selected points appear in the two-dimensional image data from the camera, wherein the updated camera calibration data indicates a second translation and a second rotation between the camera and the reference position; and using, by the one or more computing devices, the updated camera calibration data in a simultaneous localization and mapping process that determines at least one of an update to a three-dimensional environment model for the environment and an estimated position of the device within the environment.

13. An augmented reality headset, comprising:

a display, a depth sensor, a camera, one or more processors, and one or more machine- readable media storing instructions that are operable, when executed by the one or more processors, to cause the one or more processors to perform one or more operations, comprising:

capturing, by the one or more processors, a frame of data that includes (i) depth data from the depth sensor, the depth data indicating distances from the depth sensor to objects in an environment, and (ii) image data from the camera, the image data representing visible features the objects in the environment;

transforming, by the one or more processors and as transformed points, selected points from the depth data using camera calibration data for the camera, wherein the selected points are transformed to corresponding locations in a three-dimensional space that is based on the image data, and wherein the camera calibration data indicates a first translation and a first rotation between the camera and a reference position;

projecting, by the one or more processors and as projected points, the transformed points from the three-dimensional space to two-dimensional image data from the camera;

generating, by the one or more processors, updated camera calibration data based on differences between (i) locations of the projected points and (ii) locations that features representing the selected points appear in the two-dimensional image data from the camera, wherein the updated camera calibration data indicates a second translation and a second rotation between the camera and the reference position; and using, by the one or more processors, the updated camera calibration data in a simultaneous localization and mapping process that determines at least one of an update to a three-dimensional environment model for the environment and an estimated position within the environment.

* * * * *